(12) United States Patent
Li et al.

(10) Patent No.: US 11,847,180 B2
(45) Date of Patent: Dec. 19, 2023

(54) METHOD AND SYSTEM FOR RECOMMENDING LOCATION-BASED DIGITAL CONTENT

(71) Applicant: Framy Inc., Grand Cayman (KY)

(72) Inventors: Yu-Hsien Li, Taipei (TW); Chia-Yuan Cheng, Taipei (TW)

(73) Assignee: Framy Inc., Grand Cayman (KY)

( * ) Notice: Subject to any disclaimer, the term of this patent is extended or adjusted under 35 U.S.C. 154(b) by 171 days.

(21) Appl. No.: 17/529,205

(22) Filed: Nov. 17, 2021

(65) Prior Publication Data

US 2022/0300571 A1  Sep. 22, 2022

(30) Foreign Application Priority Data

Mar. 18, 2021 (TW) .................................. 110109700

(51) Int. Cl.
*G06F 16/00* (2019.01)
*G06F 16/9537* (2019.01)
*G06F 16/955* (2019.01)
*G06F 16/9536* (2019.01)

(52) U.S. Cl.
CPC ........ *G06F 16/9537* (2019.01); *G06F 16/955* (2019.01); *G06F 16/9536* (2019.01)

(58) Field of Classification Search
CPC ............. G06F 16/9537; G06F 16/9536; G06F 16/955; G06F 16/9535; G06F 16/487; G06F 16/24578; G06F 16/29; G06F 16/904; G06F 16/909; G06F 16/9558
See application file for complete search history.

(56) References Cited

U.S. PATENT DOCUMENTS

| | | | |
|---|---|---|---|
| 9,710,946 B2 | 7/2017 | Liu et al. | |
| 10,110,541 B2* | 10/2018 | Li | G06F 16/487 |
| 10,311,119 B1* | 6/2019 | Gollapudi | G06F 16/287 |
| 10,664,482 B2* | 5/2020 | Nalliah | G06Q 10/00 |
| 11,436,508 B2* | 9/2022 | Cintas | G06N 20/20 |
| 11,514,113 B2* | 11/2022 | Fox | G06F 40/56 |

(Continued)

FOREIGN PATENT DOCUMENTS

| | | |
|---|---|---|
| CN | 103514290 A | 1/2014 |
| JP | 2008242639 A | 10/2008 |

(Continued)

*Primary Examiner* — Noosha Arjomandi
(74) *Attorney, Agent, or Firm* — Li & Cai Intellectual Property Office

(57) ABSTRACT

A method and a system for recommending a location-based digital content are provided. The system includes a serving system having a database that stores a plurality of location-based digital contents and relevant hashtags. The system provides a browser program executed in a user device. The browser program is used to connect to the serving system for browsing the location-based digital contents provided by the serving system. In the method, the serving system receives position information from the user device so as to determine a geographic range. After querying the database, location-based digital contents within the geographic range can be obtained. The hashtags associated to the location-based digital contents within the geographic range can be obtained and displayed on the user interface for recommending the location-based digital contents within the geographic range to the user.

18 Claims, 10 Drawing Sheets

(56) References Cited

U.S. PATENT DOCUMENTS

| | | | |
|---|---|---|---|
| 2007/0233385 A1 | 10/2007 | Dicke et al. | |
| 2014/0229541 A1* | 8/2014 | Dilio | H04L 65/40 |
| | | | 709/204 |
| 2014/0278987 A1* | 9/2014 | Busch | H04W 4/02 |
| | | | 705/14.54 |
| 2016/0328401 A1* | 11/2016 | Dhawan | G06F 16/9535 |
| 2017/0061294 A1* | 3/2017 | Weston | G06N 3/045 |
| 2018/0095944 A1 | 4/2018 | Akkarawittayapoom | |
| 2018/0107747 A1* | 4/2018 | Bastide | G06F 16/3322 |
| 2018/0314882 A1* | 11/2018 | Yu | G06Q 10/10 |
| 2022/0300571 A1* | 9/2022 | Li | G06Q 50/01 |
| 2023/0073220 A1* | 3/2023 | Del Villar | G06F 3/04817 |

FOREIGN PATENT DOCUMENTS

| | | |
|---|---|---|
| JP | 2018136839 A | 8/2018 |
| KR | 1020190066732 A | 6/2019 |
| TW | I546519 B | 8/2016 |

\* cited by examiner

METHOD AND SYSTEM FOR RECOMMENDING LOCATION-BASED DIGITAL CONTENT

CROSS-REFERENCE TO RELATED PATENT APPLICATION

This application claims the benefit of priority to Taiwan Patent Application No. 110109700, filed on Mar. 18, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for recommending a digital content, and more particularly to a method and a system for recommending a location-based digital content in a social media.

BACKGROUND OF THE DISCLOSURE

With rapid development of network applications and social media, social media platforms are provided by various social media for users to interact online. In addition to allowing the users to upload audio and video contents to the social media platform, the users can browse and search for the audio and video contents of interest on the social media platform, and the users can also interact with other users through posts and replies.

In conventional social media technologies, the social media platform collects activity data of the users and learns the interests of each of the users. Accordingly, the social media platform can recommend audio and video contents that match the interests of each of the users, so that stickiness between the users and the social media platform is increased.

SUMMARY OF THE DISCLOSURE

The present disclosure provides a method and a system for recommending a location-based digital content. The method is adapted to a browser program for a social media. The system recommends the location-based and/or personalized digital contents to a user through one or more hashtags displayed on the browser program.

In an aspect of the present disclosure, the system includes a serving system that has a database. The database stores user identification data of users, location-based digital contents uploaded by the users, and one or more hashtags relevant to each of the digital contents. The system provides the browser program that is executed in a user device for connecting with the serving system and browsing the location-based digital contents provided by the serving system.

In one further aspect of the present disclosure, the serving system receives position information of the user through the browser program, and then determines a location range based on the position information. The location range can be a geographic range. After querying the database, one or more location-based digital contents within the location range can be obtained. Afterwards, according to indexes of the one or more location-based digital contents within the location range, the relevant one or more hashtags of the one or more location-based digital contents within the location range are obtained.

The one or more hashtags are then transmitted to the user device by the serving system. After sorting the one or more hashtags, the one or more links of the one or more hashtags are displayed on a user interface initiated by the browser program. Afterwards, a link of a selected one of the hashtags is displayed on the user interface, and a preview page is used to display one or more preview images of the digital contents relevant to the selected hashtag.

In an aspect of the present disclosure, the serving system continuously obtains position information from the user device and determines the location range covered by the user interface. When the position information is changed or the user interface is manipulated through zoom-in, zoom-out, drag-up, drag-down, drag-left and drag-right operations, a new location range is determined by the serving system. By automatically re-querying the database, the one or more location-based digital contents and the relevant one or more hashtags that are updated can be obtained.

Further, when one or more location-based digital contents within the location range are determined according to the position information, the serving system queries the database to acquire hashtags more than the one or more hashtags to be recommended within a wider location range according to the position information.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
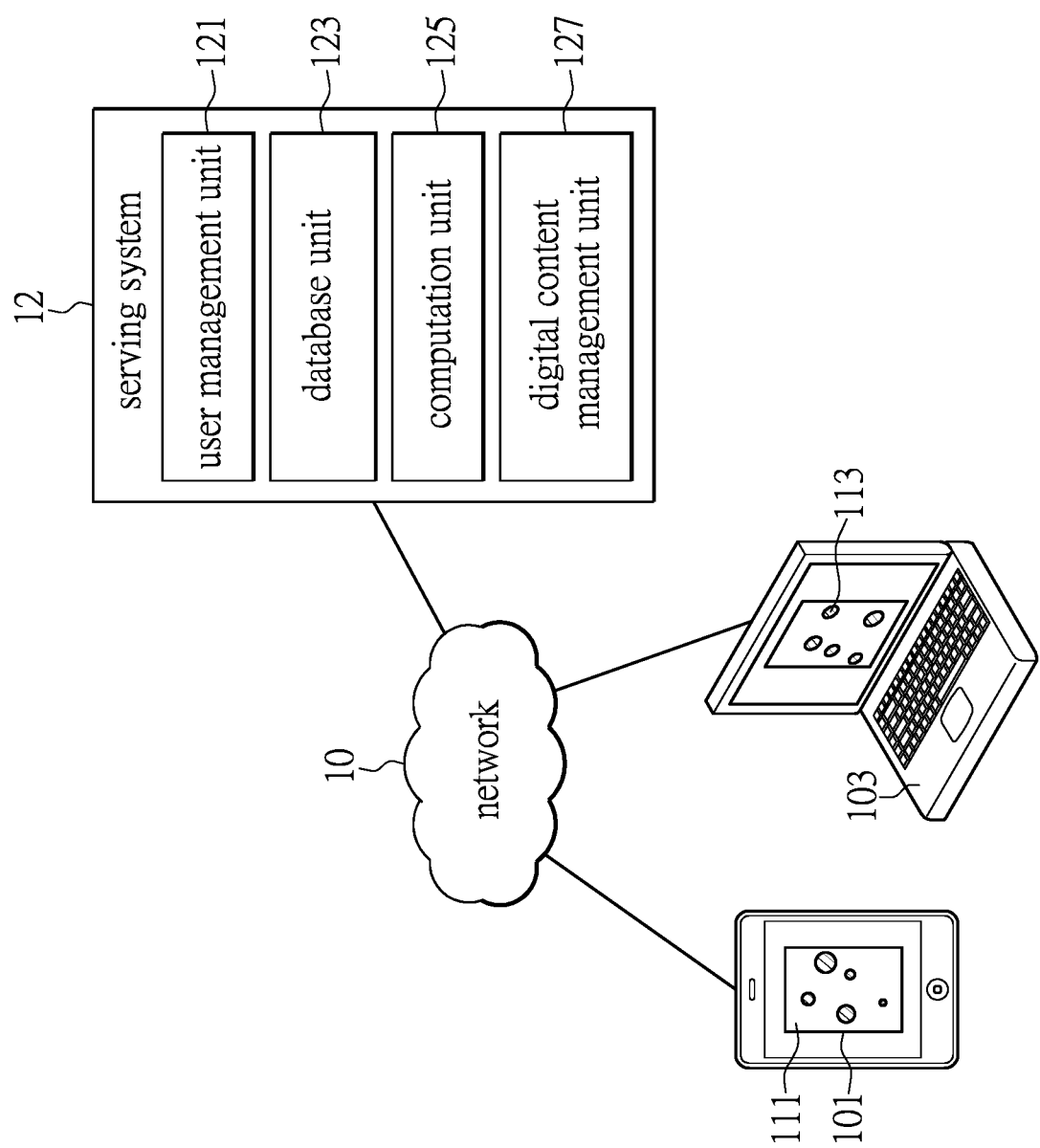
FIG. 1 is a schematic diagram depicting a system framework that implements a method for recommending location-based digital content according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure relates to a method and a system for recommending a location-based digital content. The method is adapted to applications in a social media. A user uses a browser program to browse a plurality of digital contents uploaded by other users of the social media from various places. The digital contents can be videos, audios, pictures and texts. The system provides a plurality of location-based digital contents within a location range to the user. In addition to marking the location-based digital contents uploaded by the users within the location range on a user interface, one or more hashtags, e.g., a prefix with a symbol "#", tagged on the digital contents when the digital contents are uploaded, are used to recommend the location-based digital contents to the user. The hashtags can be relevant to the digital contents which are trending, popular, with a lot of views, and/or matching with a user preference in the location range.

When the digital content is created, a metadata associated to the digital content is created simultaneously. The metadata records at least the position information of the digital content. The position information can be a geographic location, or longitude and latitude. The one or more hashtags tagged with the digital content which is a location-based digital content are also changed with the position information and become location-based hashtags. Therefore, the system allows the user to promptly acknowledge the popular topics relating to a specific location range through the one or more hashtags that are also a basis for the system that recommends the location-based digital contents.

Reference is made to FIG. 1, which is a schematic diagram depicting a system framework of the system for recommending a location-based digital content according to one embodiment of the present disclosure. In the diagram, a serving system 12 is provided for serving digital contents to various user devices 101 and 103 via a network 10. The serving system 12 allows the user devices 101 and 103 to obtain links of the digital contents via the network 10. In each of the user devices 101 and 103, a software procedure is executed to dynamically display digital contents with the change of locations. The software procedure is able to link to the serving system 12 to receive the links of the digital contents, obtain the digital contents according to requirements, so that the digital contents can be browsed and played. In particular, the links of the digital contents can be displayed as pictures using scenes of specific circumstances or an electronic map, such as the graphical user interfaces 111 and 113 that are exemplarily shown on the screens of the user devices 101 and 103 respectively. The serving system 12 and software programs executed in the user devices 101 and 103 embody the system that implements the method for recommending a location-based digital content.

The user device 101 or 103 is such as a user-end mobile device that has a touch screen that allows the user to operate by gestures of fingers. The user can use gestures to decide to browse a display area and select a linking icon that can be a user-linking icon or a point of interest (POI) linking icon marked on a browsing page via the software programs executed in the user device 101 or 103. After selecting the linking icon, a playback page is initiated by the software programs to play the digital contents associated to the selected linking icon.

Multiple functional elements are implemented in the serving system 12 by using software or through cooperation with hardware. One of the functional elements in the serving system 12 is a user management unit 121. The user management unit 121 is used to manage the users who provide the digital contents to the serving system 12. By the user management unit 121, the user is permitted to browse and play the digital contents through identity authentication. The user management unit 121 also stores the records of use of digital contents in the serving system 12 of each of the users, the digital contents that the users create, and activity records of the users in the relevant social media.

The serving system 12 includes a database unit 123 that can be a database. A plurality of user identification data (e.g., a user ID) of multiple users and files of digital contents uploaded by the users are stored in the database. In particular, the digital contents are location-based digital contents tagged with location information and hashtags that are annotated by the users or the system. Each of the digital contents has a database address in the database unit 123, that is, each of the digital contents in the display area is linked to a corresponding database address of a physical file. The database unit 123 allows a software procedure in the user device to query the database based on the display area. Preferably, by querying the database of the serving system 12, a plurality of digital contents associated to the display area, a linking address of each of the digital contents, coordinates of each of the digital contents and hashtags within the display area, and a score of each of the digital contents can be obtained.

The serving system 12 includes a computation unit 125 that is a circuit for processing data such as a geographic coordinate range of a display area, a linking address of the digital content, digital contents and locations associated to the linking icon, display content to be refreshed, and a score of digital content provided by the user device.

The digital content management unit 127 is used to process the uploaded and downloaded digital contents. The digital contents can be stored to a database. A database address corresponding to the digital contents and the coordinates of the linking icon are rendered and stored to the database along with data of the authoring user of the digital contents.

The graphical user interface 111 or 113 can show an electronic map. The linking icons of the digital contents are displayed at certain locations in the display area according to the corresponding geographic coordinates that the digital contents generated. The linking icons of the location-based digital contents can be used as representative images of the links which gather a plurality of location-based digital contents. The linking icon can be a thumbnail of the digital content, or an image of an avatar or a picture of a user who produces the digital content.

The score of the digital content can be obtained according to various scoring factors. The scoring factors are provided by the serving system and the digital content is scored by the serving system based on a number of creations of an authoring user of the digital content, a number of followers of the digital content, a number of times the digital content is played, a rating, a creation time of the digital content, or a personal preference of the user viewing the digital content, or any combination thereof. In practical implementations, the scoring is not limited to items listed above.

Each of the browsing users can have his own list of preferences that allows the serving system to determine interests of the user. Therefore, according to the list of preferences, the serving system can prioritize the related digital contents to be played and to set up the linking icons on the display area.

Figure 2:
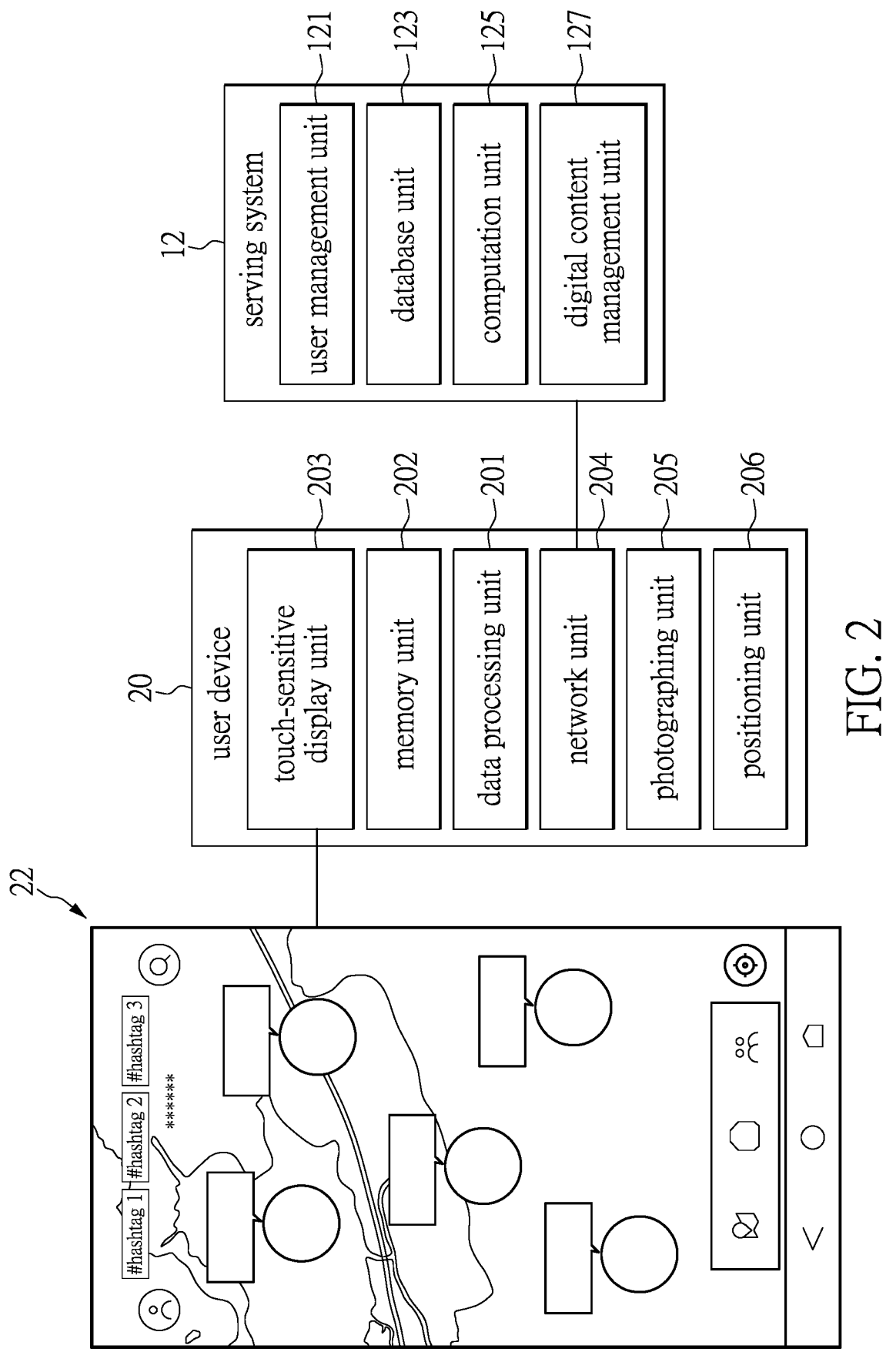
FIG. 2 is a schematic diagram depicting functional elements of a serving system and a user device of a system for recommending location-based digital content according to one embodiment of the present disclosure.

Reference is made to FIG. 2, which is a schematic diagram depicting the functional elements of the serving system of the system for recommending location-based digital content and a user device according to one embodiment of the disclosure. The functional elements can be implemented by software procedure in cooperation with hardware.

According to one embodiment of the present disclosure, the serving system 12 includes the user management unit 121, the database unit 123, the computation unit 125, and the digital content management unit 127. The serving system 12 connects to a user device 20 via a network. The user device can be a portable device such as a smart device carried by the user. The user device 20 includes a data processing unit 201 for processing data, and a memory unit 202 that is a storage media of the user device 20. The memory unit 202 can be used to temporarily store the digital contents and the data (e.g., the one or more hashtags) relevant to the digital contents and linking icons that are downloaded from the database unit 123 of the serving system 12.

The user device 20 includes a touch-sensitive display unit 203 that is a circuit allowing the user to operate and decide the display area, and a network unit 204 that is a circuit allowing the user device 20 to connect to the serving system 12. After establishing the connection, the user device 20 can transmit and obtain the information about the digital content and download the digital content according to a link.

The user device 20 includes a photographing unit 205 that is a circuit allowing the user to produce the digital content by operating the user device 20. The user device 20 includes a positioning unit 206 that is used to generate positioning data of the user device 20. The positioning unit 206 is such as a receiver of a global positioning system (GPS). The GPS data is used for positioning the user device 20. When the positioning unit 206 of the user device 20 generates the positioning data and the touch-sensitive display unit 203 displays a display area, the data can be transmitted to the serving system 12 via the network unit 204. The serving system 12 then responds to these data by transmitting links of the digital contents associated to the display area to the user device 20. Through a software procedure operated in the user device 20, the linking icon to be displayed is determined. A graphical user interface 22 is provided for showing a selectable linking icon and playable digital contents.

The display area is such as an electronic map or a user interface with a simulated circumstance. In particular, the linking icons are shown on the display area in a non-uniform arrangement. For example, in the electronic map, the serving system 12 relies on a location of the user or a specific location decided by the user to provide the contents for the user.

Figure 3:
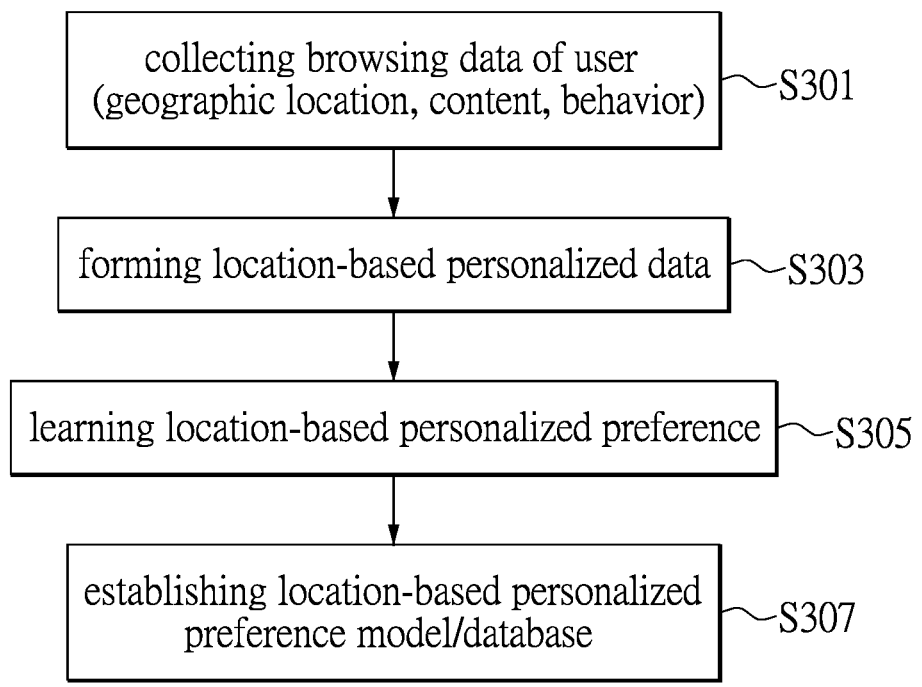
FIG. 3 is a flowchart describing a process for forming a user preference in a method for recommending location-based digital content according to one embodiment of the present disclosure.

FIG. 3 is a flowchart describing a process for forming a user preference in the method for recommending the location-based digital content according to one embodiment of the present disclosure.

According to one of the embodiments, such as in step S301, the serving system gathers browsing data of the user through a browser program executed in a user-end computer device. The features of the data are correlated to the geographic location. In an exemplary example, the user manipulates a mobile device that executes the browser program. When the user arrives at a location, the user reports or produces a video, an audio, a picture, or a text within the geographic range by a program, e.g., the browser program. The video, the audio, the picture, or the text is uploaded to the serving system after the user device is connected to the serving system. The content uploaded to the serving system includes metadata that at least records the geographic information and user identification data relating to the content. It should be noted that the serving system can obtain the user identification data when the user logs on the system. In step S303, the serving system analyzes the uploaded content for forming the location-based personalized data that is stored in the database of the serving system.

In addition to establishing the database with the location-based contents by the serving system, the serving system collects the activity data of the users over the network through software programs executed in the user-end computer devices. In step S305, the serving system can rely on the geographic information of various activity data to establish the location-based personalized data of the users. A machine-learning algorithm can be incorporated to learn data features from the geographic data and weights with respect to the data features. In step S307, a location-based personalized preference model that is used to define each user preference is formed for each of the users. The data features may also be combined to constitute a location-based user preference. The serving system can accordingly rely on the user preference to provide one or more location-based personalized contents. It should be noted that different weights will be calculated and applied to the data features learned through the machine-learning algorithm according to levels of relevance of the data features. The data feature with higher relevance can be assigned with a higher weight, and the data feature with lower relevance can be assigned with a lower weight. Therefore, the user preference can be accurately described.

In one embodiment of the disclosure, the activity data collected by the serving system from the end user computer devices includes the activities on various social media, the search records, the followed contents, and the browsed contents including the hashtags of the contents, and the time itineraries of the activities. For example, browsing records collected by the serving system can be cookies, copies, and history records kept in a web browser. The activities on the social media are such as acts of check-ins, search records, likes, shares, follows, and replies. The information relating to the activities may include records of geographic locations. The records may cover the data of the related geographies and the location-based media contents. Further, when determining a level of the user preference, the serving system considers the time spent, the period of time, the frequency and length of time spent by the user browsing the content, and if the user shares the content to other users, and whether or not the content is produced by the user. The serving system relies on these data to establish the location-based personalized preference model and the database. The serving system can therefore perform a sorting of preference while providing the location-based personalized content to the user.

According to one of the embodiments, the serving system provides the contents to be browsed on an electronic map through the browser program executed in the end user computer device when the user browses the contents on the electronic map. Each of the contents links to a specific geographic location. While the user browses the contents, the serving system simultaneously gathers browsing records such as videos, audios, pictures, and/or texts from the user. Records generated include the user identification data, the geographic location or a geographic range (latitude and longitude), browsing contents, and activities (such as likes, bookmarks, shares, etc.). The records may also include tags and times assigned to the contents. The records can be references learned by a learning algorithm for constituting the user preference.

In one further embodiment of the disclosure, the browser program provided by the serving system acts as a user interface provided for the user to browse the contents. The browser program can be a web browser provided for the user to browse various contents. The browsed content and browsing record of the user, may be marked with the geographic information for the learning algorithm to learn a location-based preference of the user.

When completing the analysis of the user preference and establishing the location-based personalized preference model and the database, the serving system accordingly provides the location-based personalized contents. FIG. 3 shows a flowchart describing the method for recommending a location-based digital content according to one embodiment of the disclosure.

Firstly, the user manipulates the browser program to browse the contents displayed on a graphical user interface that is based on an electronic map, or browses the contents containing position information (e.g., geographic information) displayed on a user interface that is not based on an electronic map. The graphical user interface includes links that link to videos, audios, pictures, and/or texts. The links can be shown as pictures representing the user that allow the user to click on the pictures. The contents linked to the links are the aforementioned location-based personalized contents. In particular, the browser program may generate position information according to the geographic location browsed. For example, the browser program based on an electronic map displays a map of a geographic range according to a geographic location. The position information sent to the serving system may be a longitude and latitude of a central location of the geographic range (step S401).

In the serving system, the location range (e.g., the geographic range) may be determined according to the geographic location received from the end user computer device (step S403). According to one of the embodiments, when the user manipulates the browser program to browse a specific geographic location, the browser program transmits the geographic location or a relevant range to the serving system. By querying the database, the serving system can accordingly provide the location-based digital contents within the location range to the user. If a personalized feature is considered, the digital contents can be both location-based and personalized. In another embodiment, the browser program can be a video or a text browser. The contents to be browsed through the browser program still include the information for the serving system to determine the geographic location. For example, the metadata of the contents records the geographic information. Similarly, the serving system retrieves the position information of the contents from the browser program and accordingly provides the location-based personalized contents. In one further embodiment, the computer device manipulated by the user can be a mobile device, and the browser program executed in the mobile device can retrieve position information from signals generated by a sensor (e.g., a GPS sensor) or a wireless network module of the mobile device. The position information generated by the aforementioned manners, after being sent to the serving system, allows the serving system to provide the location-based personalized contents according to a location of the mobile device.

Under a circumstance of application, a software program executed in a user's computer device allows the user's computer device to link to the serving system, and the serving system receives the user identification data through the browser program while the user signs into the system. The serving system can also obtain a browsing range of the user device so as to determine a geographic range. The serving system can provide the location-based personalized content based on this geographic range since the user preference may be changed with respect to changes in the size of the geographic range. Further, the quantity of contents provided to the user may also be considered due to restrictions such as limitations (a screen size and resolution, etc.) of the display.

Next, according to the data received from the user device, the serving system queries the database according to the geographic range and/or the user identification data (step S405). It should be noted that the database records the videos, audios, pictures, and/or texts that are uploaded by the users that use the computer devices to report or produce the location-based contents. In the serving system, the digital contents, the position information for each of the digital contents, the user identification data and the relevance between each digital content and the hashtags are established. The system also relies on the position information generated by the browser program executed in the user device to query the database so as to acquire the location-based digital contents or the location-based digital contents that match with the user preference. The one or more hashtags tagged with the digital contents are also obtained (step S407). According to one embodiment of the present disclosure, in the serving system, the personalized features are obtained according to the identification data of the user that operates the browser program, so that the one or more location-based digital contents within the location range can be filtered based on the personalized features. Afterwards, corresponding one or more location-based linking thumbnails can be obtained and displayed on the browser program. In addition to marking the linking thumbnail on the electronic map, the serving system sorts the hashtags associated with the digital contents (step S409). One or more hashtags can therefore be obtained. The digital contents, the linking thumbnails, and the one or more hashtags are then transmitted by the serving system to the user device (step S411). The browser program executed in the user device is used to display one or more links of the one or more hashtags transmitted by the serving system. Further, the digital contents recommended by the serving system are prompted via the browser program, and a manner of prompting is not limited to a specific way. For example, an electronic map shown in FIG. 5 can be used for marking the location-based linking thumbnails corresponding to the digital contents (step S413).

In one further embodiment of the present disclosure, such as in step S407, when a specific location range is determined according to position information generated by the user device, besides querying the database for obtaining the one or more location-based digital contents within the specific location range, the serving system can consider a wider location range that is larger than the specific location range. After that, the digital contents within the wider location range can be obtained by querying the database, and the recommended hashtags are extended to the wider location range according to the position information of the user. The current embodiment shows that the serving system provides more diversified kinds of hashtags based on the user preference and the recommendations made by the serving system.

Thus, according to one embodiment of the disclosure, when the user uses the browser program to browse a specific geographic location, the serving system not only gathers the browsing records of the user, but also continuously analyzes and learns from new browsing records. In other words, the serving system continuously collects the browsing records of the user so as to learn and update the location-based personalized preference model specified to the user. The serving system can therefore provide the location-based personalized content that meets the user preference more accurately. The contents can be various video/audio contents and/or commercial information, e.g., advertisements. That is, the method allows the system to provide the contents according to the location-based user preference since the personalized user preference may be different at different locations.

Figure 5:
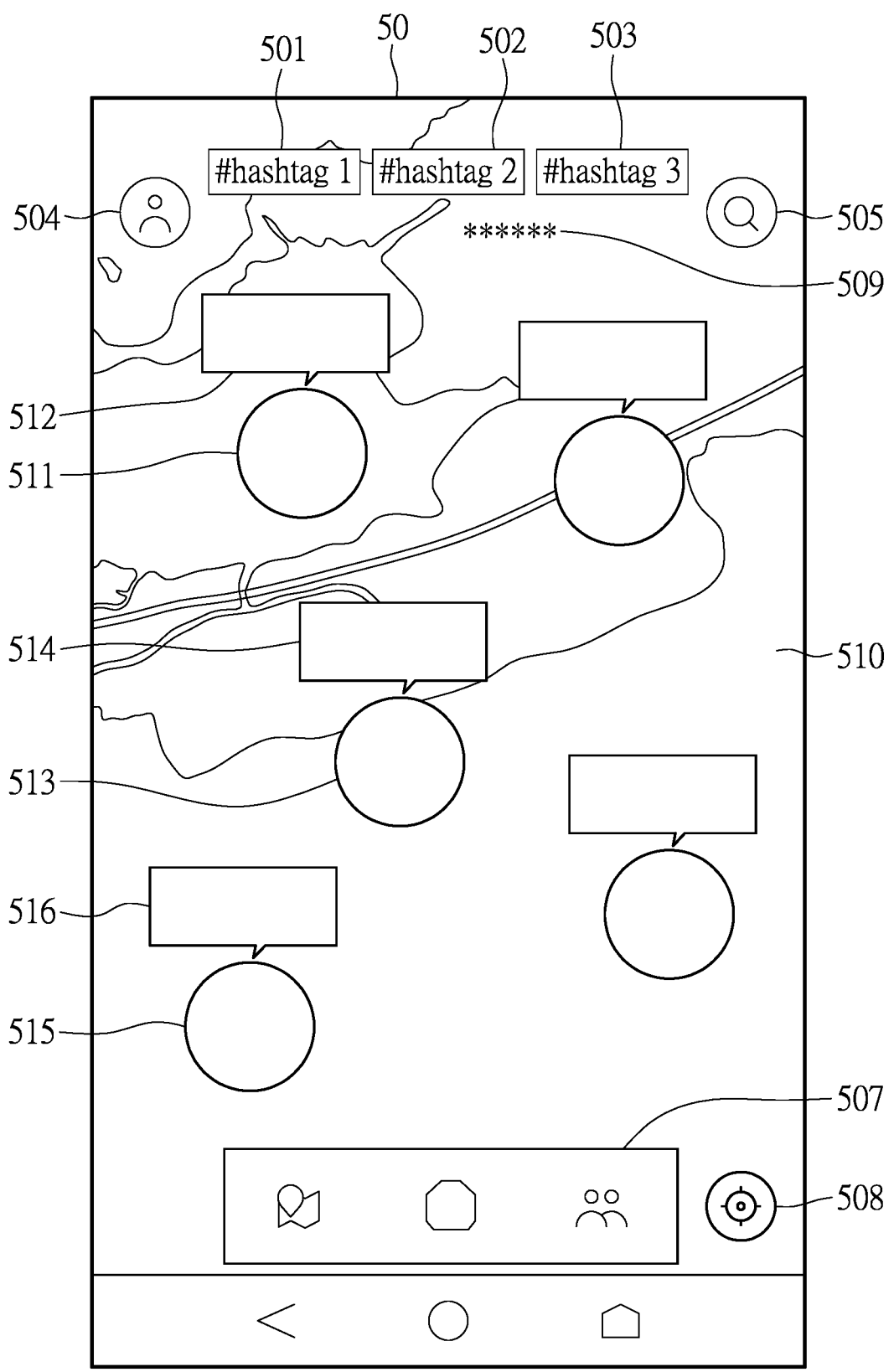
FIG. 5 is a schematic diagram depicting a main page of a software program in the method for recommending a location-based digital content according to one embodiment of the present disclosure.

Reference is made to FIG. 5, which is a schematic diagram depicting a main page initiated by a software program that implements the method for recommending a location-based digital content according to one embodiment of the present disclosure. A browser program executed in a user device initiates a graphical user interface that uses an electronic map 510 as a background. The browser connects with a serving system that provides social media service via the user device. The social media service allows the user to browse the location-based digital contents via the graphical user interface according to a current location of the user or a location range selected by the user.

According to the above embodiments, firstly, when the user opens the browser, the serving system can acquire the current location of the user. In the meantime, a main page 50 is provided by the serving system and an electronic map 510 is used as a background image. A scene including a terrain, attractions and/or streets within a specific geographic range may be shown on the electronic map 510. Further, a personal page linking thumbnail 504 shown on the scene can be used to browse personal setting of the user and the records of the user using the social media. A searching icon 505 used to search the digital contents can also be shown on the scene of the electronic map 510. After clicking on the searching icon 505, the user can type in a keyword for searching relevant contents. A quick-switching function 507 provides several shortcut keys so as to allow the user to access one of the functions quickly. For example, if the user browses a location other than the main page 50 of his current location, a specific shortcut key allows the user to quickly return to the main page 50, and another shortcut key allows the user to quickly enter a page for uploading the digital contents. One further shortcut key can be used to browse interactive contents in the social media. A positioning icon 508 is provided for the user to quickly return to the location range or geographic range of his current location.

The main page 50 shown in the diagram includes a plurality of linking thumbnails 511, 513 and 515. It should be noted that these thumbnails shown in the diagram are used as an example, and the number, size and the image in a practical application are not limited to this example. Each of the linking thumbnails 511, 513 and 515 shown on the graphical user interface is a representative image of a user who associates to a digital content. The representative image is not limited to a static image or a moving image. A linked text 512, 514 or 516 can be appended to the representative image. The linked text 512, 514 and 516 allows the user to acknowledge the content associated with one of the linking thumbnails. The linking thumbnails 511, 513 and 515 can be linking points of the digital contents that are recommended by the serving system to the user. The digital contents recommended by the serving system can be shown as the linking points which are associated with the most popular digital contents or the digital contents that match with the personalized features within the geographic range on the main page 50.

In particular, according to the process described in the above embodiments, the serving system determines a location range according to position data transmitted by a browser program executed in a user device and a display range that is regulated by a resolution of a display of the user device. The location range is covered by the initial main page 50. The location range can be changed by manipulation performed by the user, such as zoom in, zoom out, or drag-up, drag-down, drag-left and/or drag-right operations performed on a user interface. The browser program accordingly provides a corresponding scene shown on the main page 50. The serving system provides the hashtags which are continuously calculated according to the location range. For example, as shown in the diagram, the linking points shown on the browser are such as the hashtag links 501, 502 and 503 marked on the electronic map 510. The hashtag links 501, 502 and 503 are exemplarily shown as: #hashtag1, #hashtag2 and #hashtag3, respectively. In one of the embodiments of the present disclosure, the serving system relies on the hashtags being provided according to the location range where the user manipulates the browser to browse to recommend the digital contents to the user, and the serving system does not necessarily show the linking thumbnails 511, 513 and 515 on the main page 50.

Figure 4:
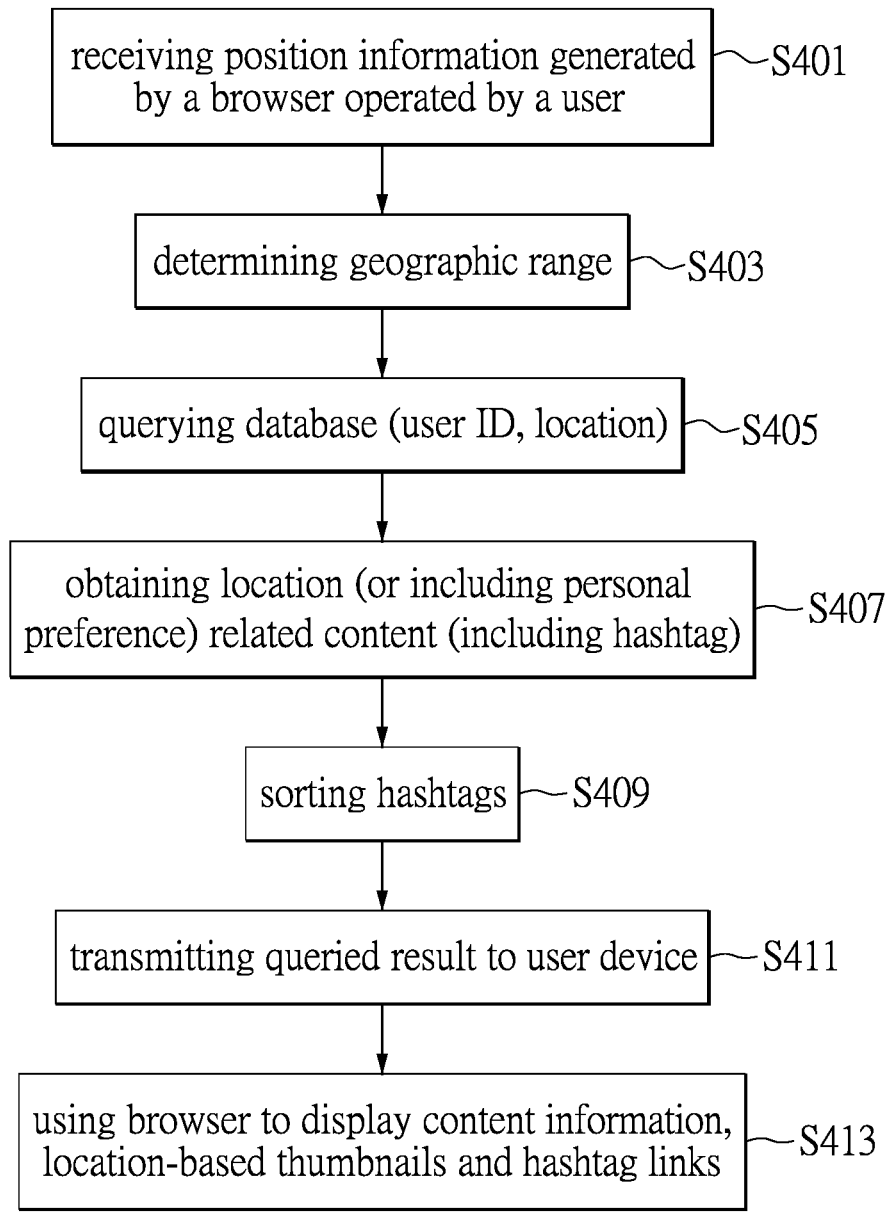
FIG. 4 is a flowchart describing the method for recommending location-based digital content according to one embodiment of the present disclosure.
Figure 6:
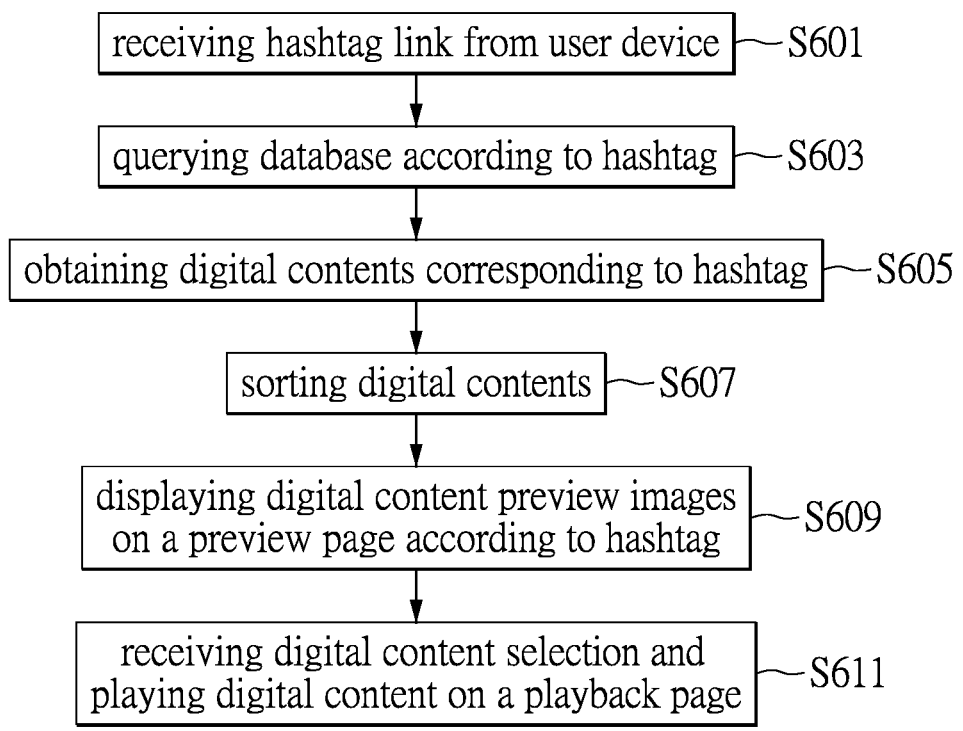
FIG. 6 is a flowchart describing a process of playing the digital content in the method for recommending a location-based digital content according to one embodiment of the present disclosure.

The hashtags provided by the serving system are the top ranking hashtags after sorting the hashtags according to certain specific conditions that can be referred to in the embodiment described in FIG. 4. For example, the most popular hashtags that are recommended to the user can be statistically obtained from the digital contents within a first coordinate range. The serving system provides the most popular hashtags, and the hashtag can be a link of a point of interest (POI). POIs recommended by the serving system can be determined based on the locations where the user had uploaded the digital contents. Accordingly, the serving system can rely on the POIs associated with the user to recommend the most popular POIs. In one further embodiment of the present disclosure, in addition to the abovementioned ways, the hashtags recommended to the user can also be obtained once the digital contents are compared with the features learned from the user preference. Reference is made to FIG. 6, which is a flowchart describing the method for recommending a location-based digital content according to one embodiment of the present disclosure.

According to the embodiments of FIG. 4 and FIG. 5, when the serving system recommends one or more hashtags to the user through the browser, the user can click on one of the hashtag links 501, 502 and 503. The follow-up actions can be referred to in the flowchart as shown in FIG. 6. In FIG. 6, the serving system receives a hashtag link signal generated by a user device (step S601). A sequence running in the serving system queries a database according to the hashtag selected by the user (step S603) so as to obtain one or more digital contents tagged with the hashtag (step S605). Furthermore, a ranking based on the ratings of the digital contents can also be obtained (step S607).

In one embodiment, top ranking ones of the one or more hashtags are obtained by sorting the one or more hashtags after a sorting can be provided to the user device. Accordingly, one or more links of the top ranking one or more hashtags are shown on a user interface. The hashtags queried by the serving system can be sorted based on one or any combination of number of the digital contents, number of followers, times of playing, rating and creation times of the digital contents relevant to each of the hashtags.

Figure 7:
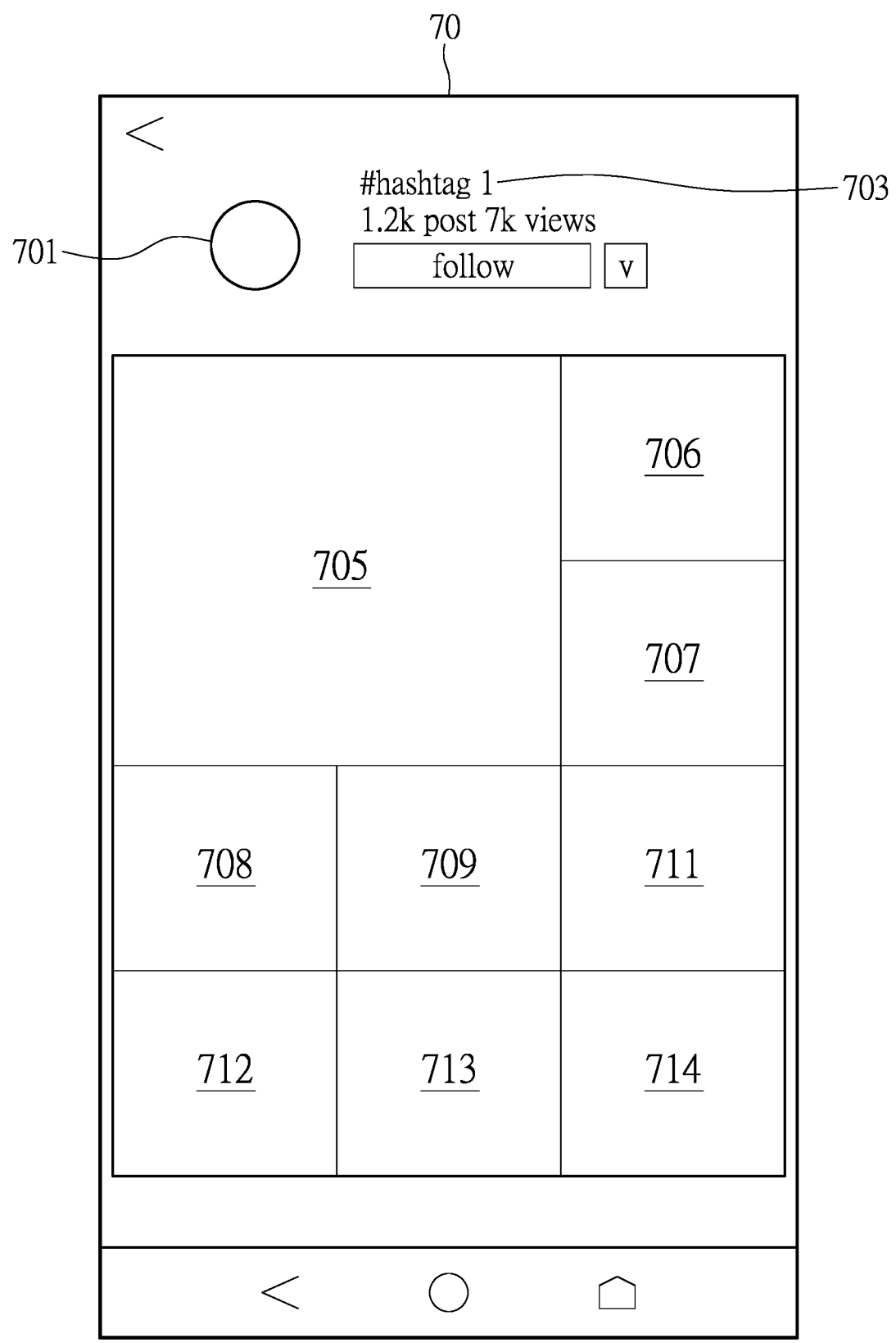
FIG. 7 is a schematic diagram depicting a preview page for reviewing the digital contents in the method for recommending a location-based digital content in one embodiment of the present disclosure.

Afterwards, the browser program executed in the user device initiates a preview page for displaying one or more preview images of one or more hashtags tagged with the selected hashtag (step S609). FIG. 7 is a schematic diagram depicting the preview page in one embodiment of the present disclosure. A preview page 70 for the digital contents is shown. A representative thumbnail 701, a hashtag 703 and multiple preview images 705 to 714 are exemplarily shown on the preview page 70. Each of the preview images 705 to 714 is a link for playing a digital content.

Further, when the user selects one of the links of the hashtags that are relevant to the digital contents via the preview page, a display order of the one or more preview images is determined according to one or any combination of a distance, an activity data and a degree that matches with personalized features, or according to a calculated weight from the one or more digital contents.

As discussed in above embodiments, when the serving system provides the preview images 705 to 714 of the digital contents through the preview page 70, these preview images 705 to 714 can be sorted based on certain conditions. For example, distances between the locations associated with the digital contents and the position information generated by the user device can be referred to for sorting the preview images, in which one of the preview images with the closest distance (e.g., closest to the user's location) has the highest priority to be previewed. Further, the preview images can be sorted according to activity data such as time information associated to the digital contents. For example, the preview image has the highest priority to be previewed if any activity relevant to the digital content occurs recently or the digital content corresponding to the preview image has the highest number of activities such as likes, shares and messages. Still further, the preview images can be sorted based on the features of the user preference learned by the serving system. One of the preview images is displayed first since features of the corresponding digital content are closest to the features of the user preference. Furthermore, the distances, activity data and the user preference can be weighted for determining a display order of the preview images 705 to 714.

Figure 8:
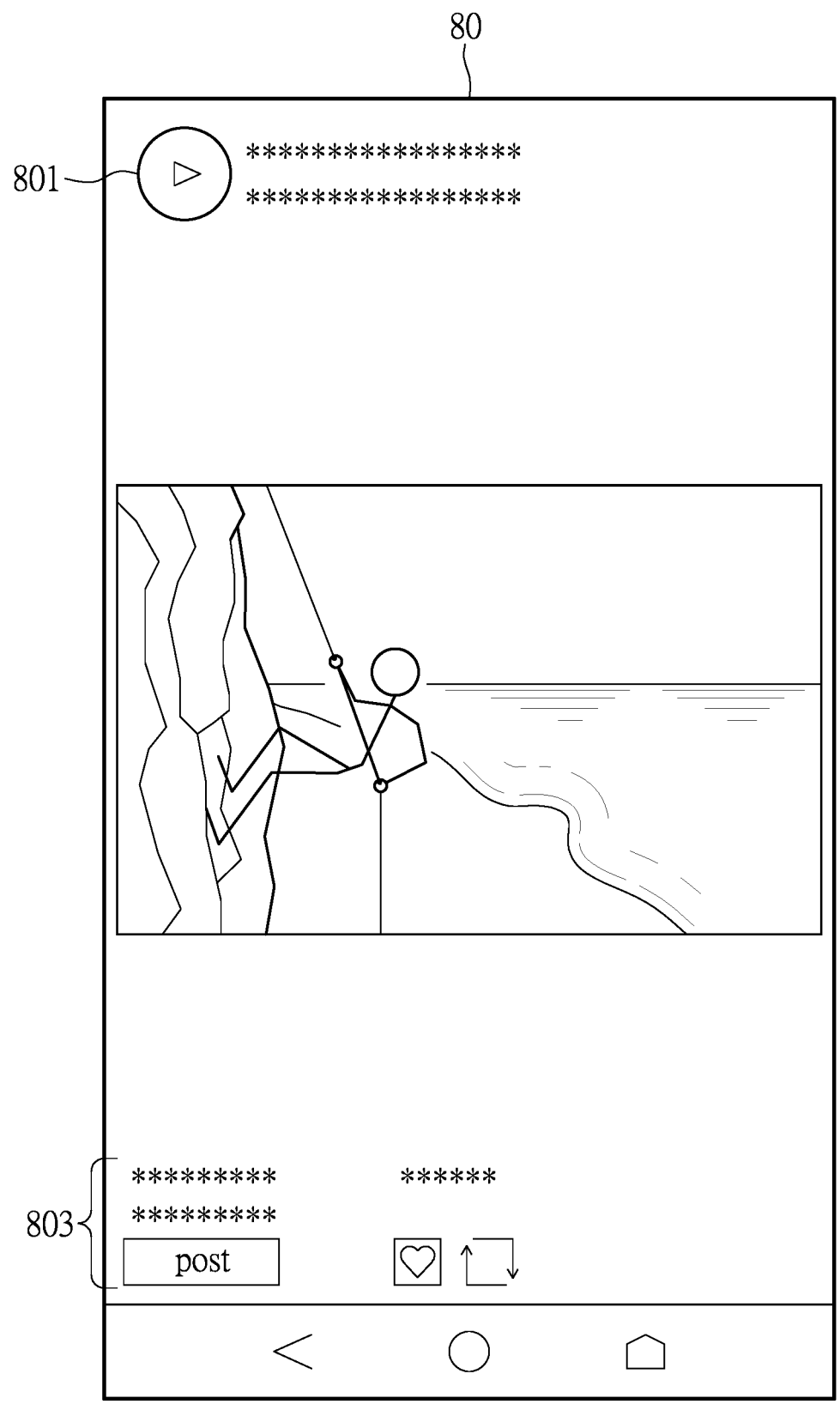
FIG. 8 is a schematic diagram depicting a playback page for playing the digital contents in the method for recommending a location-based digital content in one embodiment of the present disclosure.

Then, the user can select one of the digital contents from the preview images 705 to 714. When the serving system receives a selection signal with respect to the digital content, the digital content is played on a playback page initiated by the browser program (step S611). The playback page is exemplarily shown as in FIG. 8 in one embodiment of the present disclosure. A playback page 80 shown in FIG. 8 plays a digital content. A user thumbnail 801 and interactive messages 803 from other users relevant to the digital content to be played can also be shown on the playback page 80.

According to one of the embodiments of the present disclosure, the user device receives multiple hashtags from the serving system through the browser program executed in the user device. The hashtags are annotations being tagged on the digital contents when the digital contents are created and uploaded to the serving system. Alternatively, the hashtags can also be annotations actively tagged by the serving system according to features of the digital contents. The hashtag can also be annotated with respect to a specific geographic location such as a tourist attraction or a landmark.

In general, the serving system can constantly receive the position information from the user device and the location range covered by the user interface. Therefore, a new location range can be determined by the serving system immediately if the position information changes. For example, the position information changes if the location of the user device changes, or the location range changes when the user manipulates the user interface by performing zoom-in, zoom-out, drag-up, drag-down, drag-left and/or drag-right operations. The serving system also re-queries the database for acquiring updated one or more location-based digital contents automatically, corresponding one or more location-based linking thumbnails and one or more relevant hashtags. Accordingly, the links associated with the one or more hashtags can also be updated on the user interface. The serving system constantly collects and learns activities of the user when the user uses the browser to browse the digital contents. The serving system establishes and constantly updates a location-based personalized preference model that is used to depict the personalized features by analyzing and learning the new browsing records. The serving system is able to provide one or more location-based personalized hashtags to the user device based on the location-based personalized preference model.

In an exemplary example, the serving system firstly receives first position information from the user device via the browser. The first position information can be information with respect to the current location of the user, or a location range when the user manipulates the user device to browse the location range. The first position information correlates to a first coordinate range. The serving system queries the database according to the position information for acquiring one or more location-based digital contents correlating to the first coordinate range, and also relies on the records of the database to obtain one or more hashtags tagged with each of the location-based digital contents. After that, the hashtag links 501, 502 and 503 as shown in FIG. 5 are shown. When the user manipulates the user device to change the location or the location range to be browsed, the serving system receives second position information different from the first position information from the browser. Similarly, the second position information correlates to a second coordinate range. In the meantime, one or more digital contents within the second coordinate range are obtained and the hashtags are also re-calculated for recommending to the user. When the user adjusts the location range repeatedly, the serving system can synchronously calculate the new hashtags.

Figure 9:
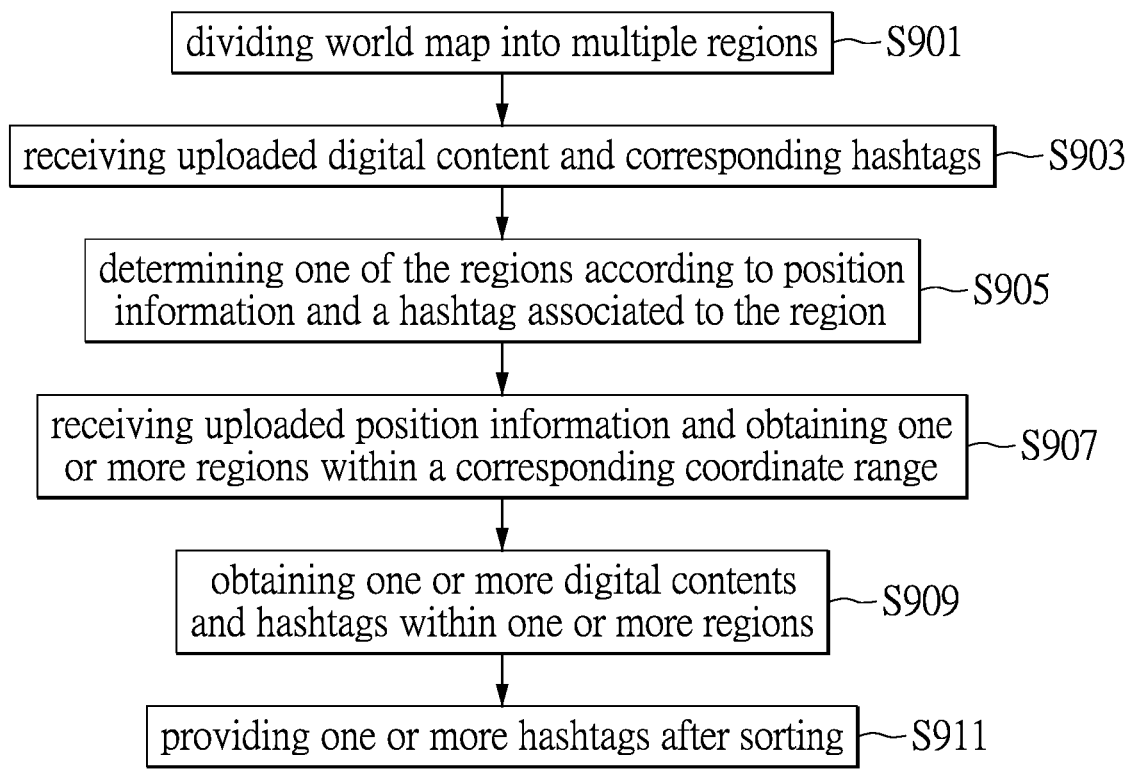
FIG. 9 is a flowchart describing a process of generating hashtags in the method for recommending a location-based digital content according to an embodiment of the present disclosure.
Figure 10:
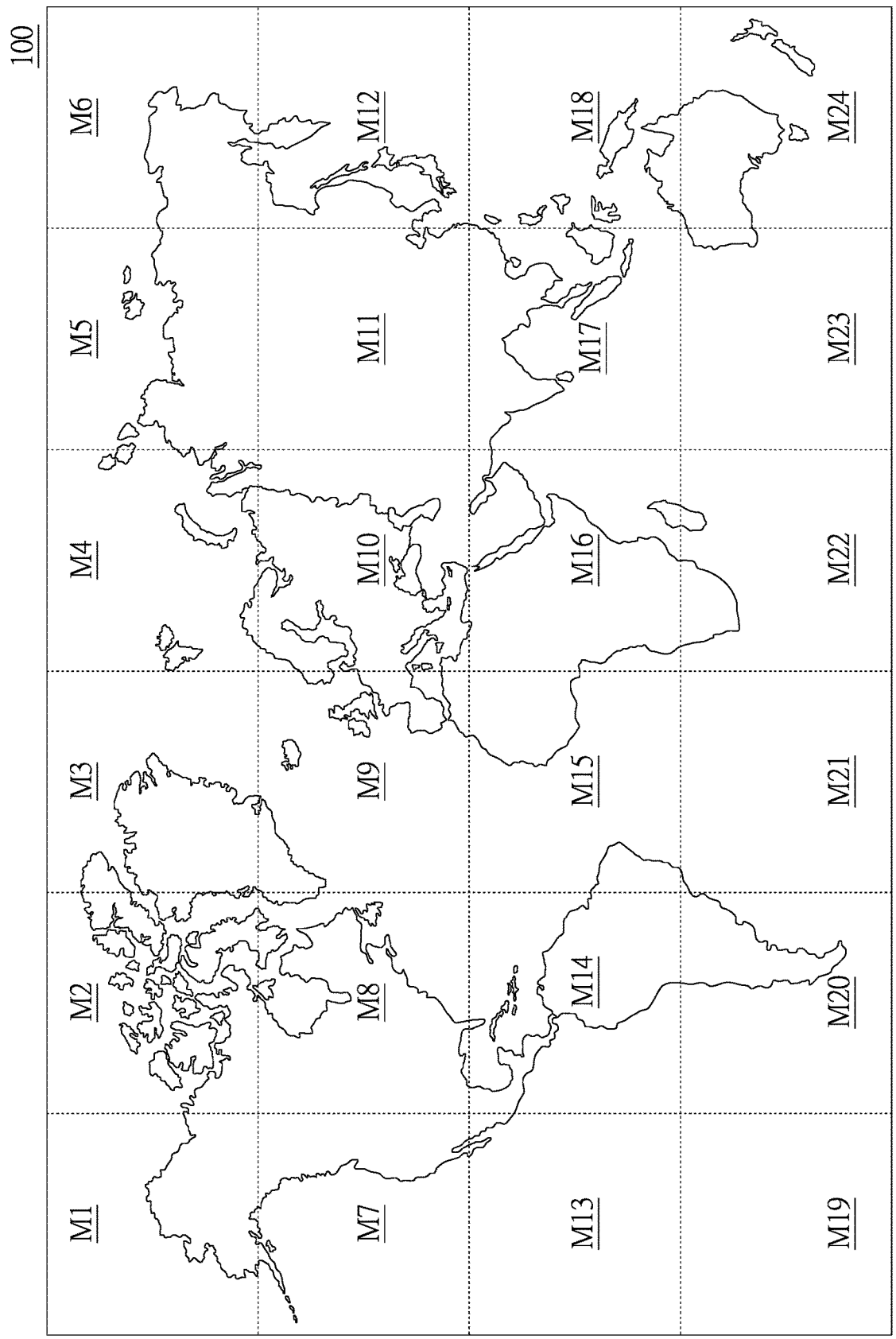
FIG. 10 is a flowchart describing the process of generating the hashtags by adopting multiple regions in one embodiment of the present disclosure.

According to one further embodiment of the present disclosure, the serving system adopts a manner that can save computing resources to generate the hashtags. For example, the serving system can only query the digital contents within a differential range that is within the second coordinate range but not covered by the first coordinate range. In other words, the serving system can only calculate one or more hashtags tagged with the digital contents within the differential range, and then combine the one or more hashtags with the hashtags that belong to the coverage of the first coordinate range. An updated set of hashtags to be recommended to the user can therefore be generated. However, if the differential range is less than a range threshold, the calculation can be ignored. FIG. 9 and FIG. 10 provide a further embodiment.

Reference is made to FIG. 9, which is a flowchart describing a process of forming one or more recommended hashtags according to one embodiment of the present disclosure. FIG. 10 shows an exemplary example that uses multiple location blocks to calculate the recommended hashtags in one embodiment of the present disclosure.

A location range covers a whole world or a regional zone. In FIG. 10, a world map 100 defines the location range and can be divided into multiple regions (step S901), e.g., the multiple regions M1 to M24. In a practical application, the number of the regions or a division method (not necessarily rectangular) can be decided based on the computing capacity of the serving system and a habit of the user of manipulating the browser. When the serving system receives a digital content uploaded by a user from the whole world or the regional zone and one or more hashtags tagged with the digital content (step S903), one of the regions can be determined based on the position information generated by the user device. In the database, the hashtags are associated to the region through indexes (step S905).

When the serving system receives the position information uploaded from the browser program executed in the user device, one or more regions covered by the coordinate range are obtained by querying the database (step S907). Therefore, one or more location-based digital contents and the corresponding hashtags can be obtained from the one or more regions covered by the coordinate range (step S909). Hashtags that meet the relevant conditions described in the above embodiments can be firstly obtained, and then one or more hashtags can be provided for the user after sorting the hashtags (step S911). In the serving system, personalized features are obtained according to an identification data of a user who operates the browser program so as to filter the one or more location-based digital contents within the location range based on the personalized features. Then, one or more corresponding location-based linking thumbnails are obtained and shown on the browser program.

It should be noted that, in addition to the serving system calculating the hashtags recommended to the user according to the above-mentioned popularity, timeliness and personalized features of the user, the serving system can also actively recommend other hashtags to the user. For example, the serving system can recommend the hashtags associated with a region near the location of the user, adjacent regions, or an area larger than the location range to be browsed by the user. The hashtags recommended by the serving system can also be relevant to a specific season, a festival, or a commercial advertisement.

Further, in one of the above embodiments of the present disclosure, when the serving system recommends the hashtags associated with a location range that is determined based on the location of the user, under a specific purpose, the serving system can provide one or more hashtags associated with areas not covered by the location range. For example, the serving system further recommends one or more hashtags to the user and allows the user to know more about the surrounding geographic range based on the user preference. That is, the serving system introduces the one or more hashtags from a larger area centered at a current location of the user. For example, when the user browses a geographic range that mostly includes the New York area, the serving system calculates the recommended hashtags from adjacent areas of the New York area, such as Philadelphia and Washington D.C., so that the hashtags to be recommended can cover a larger geographic range.

In summation, according to the embodiments relating to the method for recommending location-based digital content and the system, the system implements a social media service that allows the users to obtain location-based hashtags recommended by the system conveniently. The method allows the users to acquire the recommend digital contents quickly through the hashtags. Further, the system also filters out the location-based digital contents within a specific location range according to the personalized features. Through the system, the users can view many location-based videos, audios, pictures and texts reported, produced and uploaded by the other users. The serving system collects and learns records generated when a user browses the digital contents by the browser program, continuously analyzes and learns new browsing records so as to create a location-based personalized preference model that describes personalized features.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for recommending a location-based digital content, operated in a serving system, comprising:
receiving position information generated by a browser program executed in a user device, wherein the browser program is used to browse the digital content with the position information;
determining a location range according to the position information, and obtaining one or more location-based digital contents by querying a database; and
providing one or more hashtags to the user device and then displaying one or more links of the one or more hashtags on a user interface initiated by the browser program;
wherein, a process of obtaining the one or more hashtags that are relevant to the one or more location-based digital contents within the location range includes:
determining one or more regions covered by the location range; and
querying the database for acquiring the one or more location-based digital contents covered by the one or more regions and one or more corresponding hashtags;
wherein the location range is within a whole world or a regional zone, and in the serving system, the whole world or the regional zone is divided into multiple regions; when the serving system receives the location-based digital contents uploaded by the user from any position within the whole world or the regional zone, the serving system determines the region associated to each of the location-based digital contents based on the position information, and links the one or more hashtags relevant to each of the digital contents to the region associated to each of the location-based digital contents, so that the digital contents and information relating to the regions and the hashtags are stored to the database.

2. The method according to claim 1, wherein the serving system continuously receives the position information from the user device and the location range covered by the user interface; when a new location range is determined by the serving system, an updated set of one or more location-based digital contents and the one or more hashtags that are relevant are obtained by automatically re-querying the database, and the one or more hashtags displayed on the user interface is updated.

3. The method according to claim 2, wherein the new location range is formed when the position information is changed or the user interface is manipulated through zoom-in, zoom-out, drag-up, drag-down, drag-left and drag-right operations.

4. The method according to claim 1, wherein, when the one or more location-based digital contents are obtained within the location range that is determined according to the position information, the serving system queries the database to acquire more hashtags extended to wider location range according to the position information.

5. The method according to claim 1, wherein the browser program initiates a graphical user interface that uses an electronic map as a background for browsing the digital contents with the position information.

6. The method according to claim 1, wherein top ranking ones of the one or more hashtags are obtained by sorting the one or more hashtags that are provided via the user device, and links of the top ranking ones of the one or more hashtags are displayed on the user interface; wherein the one or more hashtags are sorted based on one or any combination of number of the digital contents, number of followers, number of times being played, rating and creation time of the digital contents relevant to each of the hashtags.

7. The method according to claim 1, wherein, in the serving system, personalized features are obtained according to an identification data of a user that operates the browser program so as to filter the one or more location-based digital contents within the location range based on the personalized features.

8. The method according to claim 1, wherein the serving system collects and learns from records generated when a user browses the digital contents by the browser program, continuously analyzes and learns new browsing records so as to create a location-based personalized preference model that describes personalized features, and provides the one or more hashtags that are location-based and personalized to the user device according to the location-based personalized preference model.

9. The method according to claim 1, wherein, after one of the links of the hashtags displayed on the user interface is selected, a preview page is used to display one or more preview images with respect to the one or more digital contents corresponding to the selected hashtag; wherein a display order of the one or more preview images is determined according to one or any combination of a distance, an activity data and a personalized feature matching degree, or according to a calculated weight from the one or more digital contents.

10. A hardware system for recommending a location-based digital content, comprising:
a serving system having a database, wherein the database stores identification data of a plurality of users, a plurality of location-based digital contents uploaded by the plurality of users, and one or more hashtags relevant to each of the digital contents; and
a browser program executed in a user device so as to connect with the serving system for browsing the plurality of location-based digital contents provided by the serving system;
wherein the serving system performs a method for recommending the location-based digital content, the method comprising:
receiving position information generated by the browser program, wherein the browser program is used to browse a digital content with the position information;
determining a location range according to the position information, and obtaining the plurality of location-based digital contents by querying the database; and
providing the one or more hashtags to the user device and then displaying one or more links of the one or more hashtags on a user interface initiated by the browser program;
wherein a process of obtaining the one or more hashtags relevant to the one or more location-based digital contents within the location range includes:
determining one or more regions covered by the location range; and
querying the database for acquiring the one or more location-based digital contents covered by the one or more regions and one or more corresponding hashtags;
wherein the location range is within a whole world or a regional zone, and in the serving system, the whole world or the regional zone is divided into multiple regions; when the serving system receives the location-based digital contents uploaded by the user from any position within the whole world or the regional zone, the serving system determines the region associated to each of the location-based digital contents based on the position information, and links the one or more hashtags relevant to each of the digital contents to the region associated to each of the location-based digital contents, so that the digital contents and information relating to the regions and the hashtags are stored to the database.

11. The hardware system according to claim 10, wherein, in the serving system, when the one or more location-based digital contents are obtained within the location range that is determined according to the position information, the serving system queries the database to acquire a number of hashtags more than the one or more hashtags to be recommended within a larger location range according to the position information.

12. The hardware system according to claim 10, wherein the serving system continuously receives the position information from the user device and the location range covered by the user interface; when a new location range is determined by the serving system, an updated set of one or more location-based digital contents and the one or more hashtags that are relevant are obtained by automatically re-querying the database, and the one or more hashtags displayed on the user interface is updated.

13. The hardware system according to claim 12, wherein the new location range is formed when the position information is changed or the user interface is manipulated through zoom-in, zoom-out, drag-up, drag-down, drag-left and drag-right operations.

14. The hardware system according to claim 10, wherein the browser program initiates a graphical user interface that uses an electronic map as a background for browsing the digital contents with the position information.

15. The hardware system according to claim 10, wherein top ranking ones of the one or more hashtags are obtained by sorting the one or more hashtags that are provided via the user device, and links of the top ranking ones of the one or more hashtags are displayed on the user interface; wherein the one or more hashtags are sorted based on one or any combination of number of the digital contents, number of followers, number of times being played, rating and creation time of the digital contents relevant to each of the hashtags.

16. The hardware system according to claim 10, wherein, in the serving system, personalized features are obtained according to an identification data of a user that operates the browser program so as to filter the one or more location-based digital contents within the location range based on the personalized features.

17. The hardware system according to claim 16, wherein the serving system collects and learns from records generated when a user browses the digital contents by the browser program, continuously analyzes and learns new browsing records so as to create a location-based personalized preference model that describes personalized features, and provides the one or more hashtags that are location-based and personalized to the user device according to the location-based personalized preference model.

18. The hardware system according to claim 10, wherein, after one of the links of the hashtags displayed on the user interface is selected, a preview page is used to display one or more preview images with respect to the one or more digital contents corresponding to the selected hashtag; wherein a display order of the one or more preview images is determined according to one or any combination of a distance, an activity data and personalized feature matching degree, or according to a calculated weight from the one or more digital contents.

* * * * *